United States Patent Office 3,637,554
Patented Jan. 25, 1972

3,637,554
POLYSTYRENE COMPOSITIONS
Clifford W. Childers, Bartlesville, Okla., assignor to Phillips Petroleum Company
No Drawing. Continuation-in-part of abandoned application Ser. No. 485,532, Sept. 7, 1965. This application Nov. 7, 1966, Ser. No. 592,323
Int. Cl. C08f *19/08, 41/12*
U.S. Cl. 260—23.7 R                  7 Claims

ABSTRACT OF THE DISCLOSURE

Preparation of polystyrene compositions of improved impact strength, tensile strength, and elongation by blending with polystyrene one or more branched radial block copolymers.

---

This is a continuation in part of U.S. application Ser. No. 485,532, filed Sept. 7, 1965, now abandoned.

This invention relates to a method for making polystyrene compositions with improved properties and a product thereof.

Heretofore, emulsion-polymerized synthetic rubbers have been mixed with polystyrene to overcome the brittleness of that material. However, with such mixtures of materials, although the impact strength of the polystyrene is increased slightly, the improvement is generally insufficient in many instances to satisfy many of the conditions to which a general purpose polystyrene is subjected in common use. Also, experience has shown that with such mixtures of materials one or more properties of the polystyrene cannot be improved without substantial sacrifice of one or more other, sometimes equally as important, properties.

Quite surprisingly, it has now been found that very substantial increases in not only impact strength but also tensile strength and elongation as well are obtained when a branched block copolymer is blended with polystyrene.

Accordingly, it is an object of this invention to provide a new and improved method for producing improved polystyrene compositions. It is another object of this invention to produce a new and improved polystyrene composition.

Other aspects, objects, and the several advantages of this invention will be readily apparent to those skilled in the art from the description and the appended claims.

According to this invention, the polymer that is blended with polystyrene, which polystyrene can be any commercially available, general purpose polymer, is a branched, i.e. radial, block copolymer of at least one conjugated diene and at least one vinyl substituted aromatic compound. The conjugated diene and vinyl substituted aromatic compound are polymerized in the presence of an organomonolithium initiator to produce a block copolymer which contains an active lithium atom on one end of the polymer chain. The lithium terminated block copolymer is then reacted with a polyfunctional compound which has at least three, preferably 3 to 7, reactive sites capable of reacting with the carbon-lithium bond on the end of the polymer chain and adding to the carbon possessing this bond. The result is a polymer having branches which radiate from a nucleus, which nucleus is formed by the polyfunctional compound which reacted with the lithium terminated polymer.

The polymers of this invention take the form, for example,

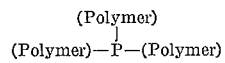

wherein P represents the polyfunctional compound to which are bonded three polymer chains, each chain prepared by polymerizing conjugated dienes and vinyl substituted aromatic compounds to form a block copolymer.

Other branched block copolymers can be employed in this invention.

One type of branched block copolymer that can be employed in this invention is a rubbery, branched block copolymer or mixture of such copolymers formed from at least one conjugated diene and at least one monovinyl substituted aromatic compound in which the branching of the block copolymer or copolymers is formed from at least one polyvinyl aromatic compound.

Monomers which can be used to prepare the polymers of this invention are conjugated dienes, containing from 4 to 12, preferably 4 to 10, carbon atoms per molecule and vinyl substituted aromatic compounds and derivatives thereof in which the total number of carbon atoms in the combined substituents is not greater than 12.

Examples of conjugated dienes include 1,3-butadiene, isoprene, 1,3-pentadiene (piperylene), 2,3-dimethyl-1,3-butadiene, 3-butyl-1,3-octadiene, 1-phenyl-1,3-butadiene, 1,3-hexadiene, 1,3-octadiene, 4-ethyl-1,3-hexadiene, and the like. Preferred conjugated dienes are butadiene, isoprene, and piperylene.

Examples of vinyl substituted aromatic compounds include styrene, 3-methylstyrene, 4-methylstyrene, 4-isopropylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 2,4-dimethylstyrene, 2,4,6-trimethylstyrene, 3-methyl-5-n-hexylstyrene, and the like. In general, 1-vinylnaphthalene, 2-vinylnaphthalene and the alkyl, cycloalkyl, aryl, alkaryl, and aralkyl derivatives thereof can be employed.

The block structure of the polymers of this invention is characterized in that the molecules of the final polymer product contain, inter alia, contiguous blocks or segments of different polymeric types, for example, one of the blocks forming each polymer chain can be a homopolymer of a conjugated diene or copolymer of the conjugated diene and a monovinyl substituted aromatic compound while an adjacent block in that same chain can be a homopolymer of a monovinyl aromatic compound or a different copolymer of a monovinyl aromatic compound and a conjugated diene. One or more conjugated diene copolymer blocks can be present in the block copolymer used in the composition of this invention. Also, mixtures of different block copolymers can be used.

The conjugated diene block should be rubbery, i.e. contain from 50 to 100 parts by weight of a polymer of conjugated diene based on 100 parts by weight of the conjugated diene block. The monovinyl substituted aromatic block is generally resinous and can be a homopolymer of a monovinyl aromatic compound or a copolymer which contains at least 80 parts by weight of monovinyl aromatic compound based on 100 parts by weight of the monovinyl aromatic block. The branched block copolymer should contain from 5 to 75 parts by weight of the monovinyl aromatic block based on 100 parts by weight of the block copolymer.

The amount of conjugated diene employed in preparing the block copolymer can vary from about 40 to about 95 parts by weight per 100 parts by weight of monomer employed to make the block copolymer, the remainder being substantially the monovinyl substituted aromatic compound or compounds. Preferably, the block copolymer contains at least 50 parts by weight of conjugated diene per 100 parts by weight of monomer employed to make the block copolymer, and at least 5 parts by weight of a monovinyl aromatic compound in the homopolymerized form per 100 parts by weight of monomers employed to make the block copolymer as determined by oxidative degradation, the remainder being substantially all a monovinyl aromatic compound.

The oxidative degradation test is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of the high molecular weight polystyrene which constitutes the homopolymer blocks of the block copolymer.

The polymers are prepared by contacting the monomer or monomers with an organomonolithium compound. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Examples of these initiators include methyllithium, n-butyllithium, n-decyllithium, phenyllithium, naphthyllithium, p-tolyllithium, cyclohexyllithium, eicosyllithium, and the like. The amount of initiator can vary depending upon the desired molecular weight of the end product but generally will be in the range of from about 1 to about 40 gram millimoles per 100 grams of monomer (mhm.).

Suitable block copolymers can be formed by several conventional techniques well known in the art. For example, the vinyl substituted aromatic compound or compounds can be charged first and allowed to homopolymerize for a finite period of time after which the conjugated diene is added together with a polar compound such as a cyclic ether (tetrahydrofuran) so that the second block of the polymer will be a random copolymer of the conjugated diene and vinyl aromatic compound, the first block being substantially a homopolymer of the vinyl aromatic compound. Also, the conjugated diene can be added first and allowed to polymerize substantially to completion at which time the vinyl aromatic compound is added to form the second block of the polymer chain. Also, the block copolymer can be formed by initially charging both the conjugated diene and the vinyl aromatic compound in the absence of a polar compound, i.e. in the presence of a hydrocarbon diluent selected from the group consisting of aromatic, paraffinic, and cycloparaffinic hydrocarbons and allowing the conjugated diene (which polymerizes more rapidly than the vinyl aromatic compound) to exhaust itself forming a first block of a random copolymer of a conjugated diene and vinyl aromatic compound after which the remaining vinyl aromatic compound homopolymerizes to form the second block of the polymer chain. The polymerization is generally carried out at a temperature of from about −20 to about 150° C. and at pressure sufficient to maintain the material present substantially in the liquid phase. The pressure employed will vary widely and can be autogenous or higher than autogenous by pressurizing the reactor in a conventional manner such as with an inert gas. Other methods of producing block copolymers are fully and completely set forth in U.S. Pat. 3,030,346.

At the conclusion of the block copolymer polymerization, the polyfunctional treating agent which contains at least three reactive sites is added to the unquenched reaction mixture. This agent must be added before any material such as water, acid or alcohol is added to inactivate and/or remove the lithium atoms present in the polymer. The temperature of this reaction can vary over a broad range, and is conveniently substantially the same as that used for the polymerization. Ordinarily the higher temperatures are preferred for this reaction, for example, from room temperature up to 125° C. and above. Temperatures above 40° C. are preferred for rapid reaction. Under such conditions, the reaction time is quite short, for example, in the range of 1 minute to 1 hour. Longer reaction periods are required at the lower temperatures.

The polyfunctional reagent which is reacted with the lithium terminated polymer must contain at least three reactive sites which are capable of reacting with the lithium-carbon bond in the polymer and thereby coupling the reagent to the polymer at this bond. For this reason, compounds containing active hydrogen atoms such as water, alcohol, acids and the like are to be avoided since such compounds replace the lithium atom with hydrogen and do not effect the desired coupling. Types of treating agents which can be used include the polyepoxides, polyisocyanates, polyimines, polyaldehydes, polyketones, polyanhydrides, polyesters, polyhalides and the like. These compounds can contain two or more types of functional groups such as the combination of epoxy and aldehyde groups or isocyanate and halide groups.

Although generally any polyepoxide can be employed, those which are liquid are preferred since they can be readily handled and form a relatively small nucleus for the radial polymer. Especially preferred among the polyepoxides are the epoxidized hydrocarbon polymers such as epoxidized liquid polybutadiene and the epoxidized vegetable oils such as epoxidized soybean oil and epoxidized linseed oil. Other epoxy compounds such as 1,2:5,6:9,10-triepoxydecane, and the like can also be used.

The polyisocyanates are preferably those compounds represented by the formula $R(NCO)_m$ where R is a polyvalent organic radical which can be aliphatic, cycloaliphatic, or aromatic and contains from 2 to 30 carbon atoms and $m$ is an integer of 3 or more, preferably 3 or 4. Examples of such compounds include benzene-1,2,4-triisocyanate, naphthalene-1,3,5,7-tetraisocyanate, triphenylmethanetriisocyanate, naphthalene - 1,3,7-triisocyanate, and the like. Especially suitable is a commercially available product known as PAPI-1, a product of Carwin Chemical Company. This material is a polyarylpolyisocyanate having an average of 3 isocyanate groups per molecule and an average molecular weight of about 380. Structurally the compounds can be represented by a series of isocyanate-substituted benzene rings joined through methylene linkages.

The polyimines which are also known as polyaziridinyl compounds are preferably those containing 3 or more aziridine rings as represented by the formula:

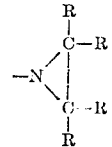

wherein each R can be hydrogen, alkyl, aryl or cycloalkyl radicals or composites of these hydrocarbon radicals, the total of the R groups containing up to 20 carbon atoms. The aziridine rings can be attached to a carbon, phosphorus or sulfur atom. Examples of these compounds are the triaziridinyl phosphine oxides or sulfides such as tri-(1-aziridinyl)phosphine oxide, tri(2-methyl-1-aziridinyl) phosphine oxide, tri(2-ethyl-3-decyl - 1 - aziridinyl)phosphinesulfide, tri(2-phenyl - 1 - aziridinyl)phosphine oxide, tri(2-methyl-3-cyclohexyl-1-aziridinyl) phosphine sulfide and the like. Also suitable are the triaziridinyl substituted triazines and the triphosphatriazines containing 3, 4, 5, or 6 aziridinyl substituted rings. Examples of these compounds include 2,4,6-tri(aziridinyl)1,3,5-triazine, 2,4,6-tri(2-methyl-1-aziridinyl)1,3,5-triazine, 2,4,6 - tri(1-aziridinyl)2,4,6-triphospha-1,3,5-triazine, 2,4,6-tri(2 - methyl-n-butyl - aziridinyl)2,4,6-triphospha-1,3,5-triazine and the like.

The polyaldehydes are represented by compounds such as 1,4,7-naphthalenetricarboxylaldehyde, 1,7,9 - anthracenetricarboxylaldehyde, 1,1,5 - pentanetricarboxylaldehyde and similar polyaldehyde-containing aliphatic and aromatic compounds. The polyketones can be represented by compounds such as 2,4,6-heptanetrione, 1,4,9,10-anthracenetetrone, 2,3 - diacetonylcyclohexanone, and the like. Examples of the polyanhydrides include pyromellitic dianhydride, styrene-maleic anhydride copolymer, and the like. Examples of the polyesters are the glycerol tristearates, glycerol trioleates and similar compounds.

Among the polyhalides, we prefer the silicon tetrahalides such as silicon tetrachloride, silicon tetrabromide and silicon tetraiodide and the trihalosilanes such as trifluorosilane, trichlorosilane, trichloroethylsilane, tribromobenzylsilane, and the like. Also preferred are the polyhalogen substituted hydrocarbons such as 1,3,5 - tri(bromomethyl)benzene, 2,5,6,9 - tetrachloro-3,7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer can also be present in the active halogen containing compounds. Alternatively, other suitable reactive groups different from the halogen as described above can be present. Examples of compounds containing more than one type of functional group include 1,3 - dichloro-2-propanone, 2,2-dibromo-3-decanone, 3,5,5 - trifluoro-4-octanone, 2,4-dibromo-3-pentanone, 1,2:4,5 - diepoxy-3-pentanone, 1,2:4,5-diepoxy-3-hexanone, 1,2:11,12-diepoxy-3-pentadecanone, 1,3:18,19-diepoxy-7,14-eicosanedione and the like.

It can be seen from the above description of suitable polyfunctional compounds that a vast number of possible reagents are available. In general the compounds are organic or, in the case of the silicon halides, have a silicon base. They are liquids and/or have relatively low molecular weights, for example, less than 2000. Also the compounds are relatively free of other reactive groups which would compete with the groups named above for reaction with the lithium-carbon bond.

Generally the amount of polyfunctional treating agent employed is in the range of from about 1.0 to about 1.5 equivalents of treating agent based upon the lithium present in the polymer. One equivalent of treating agent per atom of lithium in the polymer is substantially optimum for maximum branching.

After the polymers have been reacted with the polyfunctional compound they are recovered by treatment with material containing active hydrogen such as alcohol, acid, water, aqueous solutions, or mixtures of two or more of these materials or similar reagents. This is a conventional method for recovering polymer from organometal polymerization mixtures.

For the aspect of this invention wherein a rubbery branched block copolymer is formed in a manner in which the branching is obtained from at least one polyvinyl aromatic compound, a rubbery block copolymer is formed in the same manner as disclosed hereinabove with the exception that the rubbery block copolymer is formed in the presence of at least one polyvinyl aromatic compound. Thus, instead of forming the rubbery block copolymer and then treating same with a polyfunctional reagent to form a radial block copolymer, the instant aspect of this invention eliminates the use of a polyfunctional reagent and instead utilizes at least one polyvinyl aromatic compound which is present during the polymerization operation which initially forms the rubbery block copolymer. Thus, the amounts of conjugated diene and monovinyl substituted aromatic compound employed for preparing the rubbery block copolymer and the polymerization conditions for preparing the rubbery block copolymer as disclosed hereinabove are all applicable to this aspect of the invention. Similarly, all limitations as to the composition of the rubbery block copolymers disclosed hereinabove are equally applicable to this aspect of this invention.

The polyvinyl aromatic compound that can be used to cause branching of the rubbery block copolymer and which is present during the formation of that rubbery block copolymer can be represented by the following general formulas:

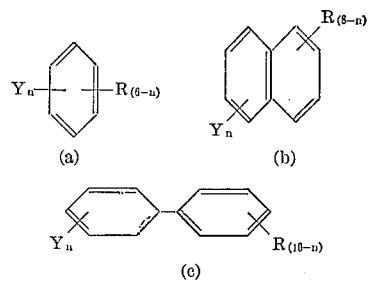

wherein Y is a vinyl group, each R is hydrogen or an alkyl group having 1 to 4 carbon atoms inclusive, with the total of all the alkyl substituents in any single formula containing not more than 12 carbon atoms, and $n$ is 2 or 3. The substituents in the above formulas (b) and (c) can be on either or both rings. The divinyl aromatic hydrocarbons containing up to 26 carbon atoms per molecule are preferred, particularly divinylbenzene as either its ortho, meta, or para isomer. Commercial divinylbenzene is quite satisfactory.

Examples of suitable polyvinyl aromatic compounds include divinylbenzene, 1,2,4-trivinylbenzene, 1,3-divinylnaphthalene, 1,8-divinylnaphthalene, 1,3,5 - trivinylnaphthalene, 2,4-divinylbiphenyl, 3,5,4'-trivinylbiphenyl, 1,2-divinyl-3,4-dimethylbenzene, 1,5,6-trivinyl - 3,7 - diethylnaphthalene, 1,3 - divinyl-4,5,8-tributylnaphthalene, 2,2'-divinyl-4-ethyl-4'-propylbiphenyl, and the like.

Different methods can be employed when preparing the rubbery branched block copolymers. All ingredients in the polymerization recipe can be charged initially and the reaction conducted at the temperature desired and for the time required to give essentially complete conversion of the monomers. Another method involves charging the conjugated diene first, allowing sufficient time for complete monomer conversion, and then charging a mixture of the monovinyl and polyvinyl aromatic compounds and continuing the polymerization. In a third method the monovinyl aromatic compound is charged first and polymerized. A mixture of the conjugated diene and polyvinyl aromatic compound is then added and polymerized. The procedure can be modified in other ways to give one random copolymer block and a homopolymer block, either of which is branched by having a polyvinyl aromatic compound present during its formation.

A small but widely variable amount of polyvinyl aromatic compound is suitable for preparing branched block copolymers. The amount will generally be in the range from about 0.005 to about 0.3, preferably from about 0.01 to about 0.15, part by weight per 100 parts by weight of monomers being polymerized.

Suitable additives such as antioxidants, stabilizers, pigments, and the like can be added to the branched block copolymer product.

The amount of branched block copolymer blended with the polystyrene will vary widely depending upon the properties desired in the final composition but will generally be in the range of from about 3 to about 50, preferably from about 5 to about 40, weight percent based on the total composition. Of course, more than one branched block copolymer can be employed in each composition.

The polystyrene and branched block copolymer can be mixed or blended in any conventional manner, a presently desired result being an intimate mixture of the components. Generally, blending in an internal mixer is preferred such as a Banbury, twin screw extruder, Brabender Plastograph, or the like, but an open mill can be employed. Also, mixing in an inert atmosphere can also be carried out as desired. Mixing temperatures can vary widely but will generally be in the range of from about 250 to about 600, preferably from about 300 to about 500° F., with mixing times in the range of from about 30 seconds to about 30 minutes, preferably from about 1 to about 20 minutes.

The polymer compositions of this invention and produced by the method of this invention are useful for packaging, housings for kitchen appliances, television sets, radios, refrigerator liners, toys, tote boxes, luggage shells, architectural trim, translucent covers for light fixtures, furniture (to replace wood), and the like.

EXAMPLE I

A heat and light stabilized, general purpose, crystal polystyrene ("Styron" 673, a trademark of and manufactured by the Dow Chemical Company) was blended with a rubbery, butadiene-styrene branched block copolymer using 75 parts by weight of polystyrene and 25 parts by weight of copolymer. In order to compare the improvement obtained by this invention, blends were prepared in which a linear block copolymer, a linear random copolymer, and an emulsion copolymer were substituted for the branched block copolymer. Blending was conducted under vacuum in an internal mixer (Brabender Plastograph). Each of the copolymers was blended with polystyrene for 10 minutes while the mixer was operated at 100 r.p.m. After removal from the mixer, the blends were compression molded at 350° F. into sheets $\frac{1}{16}$ inch in thickness. The sheets were cut into ½ inch strips from which dog bone specimens were machined. A 2 inch gage length was used for the test specimens and the width in the gage length area was ¼ inch. Tensile and elongation were measured at a drawing rate of 0.2 inch per minute. Izod impact strength was also measured. A control run was made using the polystyrene which was mixed under the same conditions employed for the blends.

The following recipe was used for preparing the branched block copolymer:

| | |
|---|---|
| 1,3-butadiene, parts by weight | 75 |
| Styrene, parts by weight | 25 |
| Cyclohexane, parts by weight | 860 |
| n-Butyllithium, mhm. | 0.19 |
| Temperature, ° F. | 120–190 |
| Time, hours | 1 |

Mhm.=gram millimoles per 100 grams monomer.

In making the branched block copolymer the styrene was polymerized first and the butadiene then added and polymerized. The conversion for making the branched block copolymer was quantitative. The polymerization was terminated with 0.5 part by weight per 100 parts by weight of monomers charged of liquid epoxidized polybutadiene ("Oxiron" 2000, a trademark of and manufactured by Food Machinery and Chemical Company), transferred to a blowdown tank, stabilized with 0.1 part by weight per 100 parts by weight of monomers charged of 2,6-di-tert-butyl-4-methylphenol in isopropyl alcohol, steam stripped and extruder dried. The resulting branched block copolymer had an inherent viscosity of 1.58 and was gel free.

The linear block copolymer was formed using the following recipe:

| | |
|---|---|
| 1,3-butadiene, parts by weight | 75 |
| Styrene, parts by weight | 25 |
| Cyclohexane, parts by weight | 780 |
| n-Butyllithium, mhm. | 0.9 |
| Temperature, ° F. | 122 |
| Time, hours | 16 |

All ingredients were charged initially and conversion was quantitative. The reaction was terminated with an isopropyl alcohol solution of 2,2'-methylene-bis(4-methyl-6-tert-butylphenol) the amount used being sufficient to provide 1 part by weight of the antioxidant per 100 parts by weight of the rubber. The polymer was coagulated in isopropyl alcohol, separated, and dried. The polymer had an inherent viscosity of 1.48 and was gel free.

The linear random copolymer was prepared using a 75/25 weight ratio of butadiene to styrene. Polymerization was conducted in the presence of n-butyllithium as the catalyst and on completion of the polymerization, 1 part by weight per 100 parts of rubber of a mixture of $C_{16}$ to $C_{18}$ saturated and unsaturated fatty acids was added to inactivate the catalyst and 1 part by weight per 100 parts of rubber of 2,6-di-tert-butyl-4-methylphenol was added as an antioxidant. The mixture was steam stripped and the wet rubber crumb was washed and dried.

The emulsion butadiene-styrene random copolymer was prepared at 122° F. using a fatty acid soap emulsifier and coagulated by salt-acid technique. This method is fully and completely set forth in the 1006 recipe of ASTM D 1419–61T. The polymer used had a bound styrene content of 23.5 weight percent and a Mooney viscosity (ML–4, 212° F.) of 50 (ASTM D 1646–63).

The mixing temperature and properties of each blend and the polystyrene control were as follows:

| | 75/25 Blends, Polystyrene & Copolymer | | | | Polystyrene control |
|---|---|---|---|---|---|
| | Branched block | Linear block | Linear random | Emulsion | |
| Mixing temperatures, ° C.: | | | | | |
| Initial | 167 | 164 | 167 | 160 | 173 |
| Final | 181 | 181 | 181 | 180 | 191 |
| Tensile strength, p.s.i. | 3,490 | 3,370 | 2,170 | 2,640 | 2,470 |
| Elongation, percent | 7.0 | 2.0 | 1.8 | 2.5 | 1.0 |
| Izod impact strength,[1] ft. lbs./in. notch | 5.0 | 1.1 | 1.7 | 2.9 | 0.2 |

[1] ASTM D 256–56, ¼ inch bar.

These data show that a very substantial increase in not only impact strength but also tensile strength and elongation was accomplished by blending polystyrene with a branched block copolymer.

These data also show that the blending of copolymers other than branched block copolymers with polystyrene yields compositions with lower tensile strength, lower elongation, and lower impact strength than the compositions of this invention.

EXAMPLE II

A series of high impact polystyrene compositions was prepared by blending in a 75/25 weight ratio a bead polymerized polystyrene ("Cosden" 550, a trademark of and manufactured by Cosden Oil and Chemical Company) with each of six rubbery branched block copolymers of butadiene and styrene wherein branching was accomplished with divinylbenzene added during preparation of the block copolymers.

Blending was conducted in an internal mixer (Brabender Plastograph). The blending chamber was flushed with nitrogen and polystyrene was introduced and mixed at slow speed until it fluxed. The rubbery branched block copolymer was added and blended with the polystyrene at slow speed of the mixer until it fluxed. The vacuum heat was closed and the chamber was evacuated. The components were then mixed three minutes at 100 r.p.m. One part by weight based on 100 parts by weight of the composition of "Agerite Geltrol" (phosphinated polyalkyl phenol) was added as the antioxidant. Mixing was continued under nitrogen for two minutes. The initial mixing temperature was approximately 150° C. and the final mixing temperature was approximately 170° C.

A control blend of polystyrene ("Styron" 673, a trademark and manufactured by the Dow Chemical Company)

and a branched rubbery 75/25 butadiene/styrene random copolymer was prepared with 0.14 part by weight per 100 parts monomers of divinylbenzene being used in the polymerization recipe to prepare the branched copolymer. The control was prepared in a Brabender Plastograph using 75 parts by weight of the polystyrene and 25 parts by weight of the rubber. The chamber was flushed with nitrogen and polystyrene was introduced and mixed at slow speed until it fluxed. The rubbery copolymer was added and blended with the polystyrene at slow speed until it fluxed. The vacuum head was closed and the chamber was evacuated. The components were then mixed at 100 r.p.m. for 10 minutes.

The following recipes were employed for preparing the rubbery branched block copolymers:

| Blend No.[1] | Tensile, p.s.i. | Elongation, percent | Flexural modulus, p.s.i./1,000 | Izod impact strength, ft. lbs./in. notch |
|---|---|---|---|---|
| 1 | 3,030 | 17 | 220 | 8.7 |
| 1 | 3,030 | 17 | 220 | 8.7 |
| 2 | 3,010 | 26 | 221 | 9.4 |
| 3 | 3,050 | 7 | 222 | 8.0 |
| 4 | 3,020 | 6 | 217 | 8.2 |
| 5 | 2,580 | 31 | 260 | 4.7 |
| 6 | 2,590 | 22 | 237 | 3.3 |
| 7 control | 2,170 | 1.8 | 196 | 1.7 |

[1] Run numbers of polymers correspond to blend numbers, i.e. polymer from run 1 was used in blend Number 1. Blend 7 was the control prepared with the random copolymer containing divinylbenzene.

These data show that significant improvements were obtained in elongation and impact strength when a rub-

|  | 1 | 2 | 3 | 4 | 5 | 6 |
|---|---|---|---|---|---|---|
| 1,3-butadiene, parts by wt.[1] | 75 | 75 | 75 | 75 | 75 | 75 |
| Styrene, parts by wt.[1] | 25 | 25 | 25 | 25 | 25 | 25 |
| Cyclohexane, parts by wt.[1] | 800 | 800 | 800 | 800 | 800 | 800 |
| Divinylbenzene, parts by wt.[1] | 0.03 | 0.07 | 0.03 | 0.07 | 0.07 | 0.1 |
| n-Butyllithium, mhm.[2] | 1.2 | 1.2 | 1.2 | 1.2 | 1.2 | 1.2 |
| Temperature, °F | 122 | 122 | 122 | 122 | 122 | 122 |
| Time, hours | 18 | 18 | 6, 16 | 6, 16 | 6, 16 | 6, 16 |

[1] All parts by weight based on total weight of butadiene and styrene.
[2] Mhm.=gram millimoles per 100 grams butadiene and styrene In runs 1 and 2 all ingredients were charged initially. In runs 3 and 4 butadiene was added initially and allowed to polymerize for six hours after which styrene and divinylbenzene were introduced and polymerization continued for 16 more hours. In runs 5 and 6 styrene was added initially and allowed to polymerize for six hours after which butadiene and divinylbenzene were introduced and polymerization was continued for 16 more hours. All reactions were shortstopped with one part by weight per 100 parts by weight butadiene and styrene charged of the antioxidant, 2,4-di-tert-butyl-4-methylphenol, employed as a 10 weight percent solution in isopropyl alcohol. The polymers were coagulated with isopropyl alcohol, separated, and dried.

The rubbery 75/25 butadiene/styrene random copolymer used in the control run was prepared in cyclohexane using 0.14 part by weight (2.2 mhm.) of n-butyllithium, 0.14 part by weight divinylbenzene, and 1 part by weight tetrahydrofuran (parts by weight based on 100 parts by weight butadiene and styrene). The polymerization was shortstopped with 0.5 part by weight per 100 parts by weight copolymer of stearic acid and one weight percent of 2,4-di-tert-butyl-4-methylphenol was added as the antioxidant. The polymer had a Mooney value (ML-4 at 212° F.) of 50.

The two polystyrenes had low elongation and low impact strength. Values on injection molded samples were as follows:

|  | "Cosden" 550 | "Styron" 673 |
|---|---|---|
| Elongation, percent | 0.4 | 2 |
| Izod impact strength,[1] ft. lbs./in. notch | 0.33 | 0.33 |

[1] ASTM N 256-56, ¼ inch bar.

After removing the blends from the mixer, they were compression molded at 350° F. into sheets ⅟₁₆ inch in thickness. The sheets were cut into ½ inch strips from which dumbbell specimens were machined. A 2-inch gage length was used for the test specimens and the width in the gage length area was ¼ inch. Tensile strength and elongation were measured at a drawing rate of 0.2 inch per minute. Izod impact strength and flexural modulus were also measured. Results were as follows:

bery branched block copolymer prepared with divinylbenzene was used in comparison with a random copolymer prepared in the presence of divinylbenzene. Tensile strength and flexural modulus were also higher in the compositions containing the branched block copolymers.

Reasonable variations and modifications are possible within the scope of this disclosure without departing from the spirit and scope thereof.

I claim:
1. A polystyrene composition with improved physical properties prepared by:
   (a) polymerizing under polymerization conditions at least one conjugated diene of from 4 to about 12 carbon atoms and at least one monovinyl substituted aromatic compound of from 8 to about 12 carbon atoms in the presence of an organolithium polymerization initiator and thereby producing a block copolymer with an active lithium atom at one end,
   (b) reacting the said block copolymer from step (a) with a polyfunctional compound of from 3 to about 7 reactive sites, said polyfunctional compound being selected from the group consisting of polyepoxides, polyisocyanates, polyimines, polyaldehydes, polyketones, polyanhydrides, polyesters, and polyhalides, and thereby producing a branched radial block copolymer,
   (c) mechanically blending with polystyrene an amount of the said rubbery branched radial block copolymer from step (b), said amount constituting from 3 to about 50 weight percent of the total of the said composition, said amount being effective to improve the physical properties of the said polystyrene, said improved physical properties including impact strength, tensile strength, and elongation.

2. The composition of claim 1 wherein the said polymerization conditions include a polymerization temperature of from about −20 to about 150° C., and a pressure sufficient to maintain essentially liquid conditions.

3. The composition of claim 1 wherein the conjugated diene block of the said block copolymer is rubbery and contains from about 50 to about 100 parts by weight of the said conjugated diene based on 100 parts by weight of the said conjugated diene block.

4. The composition of claim 1 wherein the monovinyl substituted aromatic block of the said block copolymer is resinous and is a homopolymer of the said monovinyl substituted aromatic compound.

5. The composition of claim 1 wherein the monovinyl substituted block of the said block copolymer is resinous and is a copolymer containing at least 80 parts by weight of the said monovinyl substituted aromatic compound based on 100 parts by weight of the said monovinyl substituted block.

6. The composition of claim 1 wherein the said branched radial block copolymer contains from about 5 to about 75 parts by weight of the monovinyl aromatic block based on 100 parts by weight of the said block copolymer.

7. The composition of claim 1 wherein the said block copolymer contains from about 40 to about 95 parts by weight of the said at least one conjugated diene and from about 60 to about 5 parts by weight of the said at least one monovinyl substituted aromatic compound.

References Cited

UNITED STATES PATENTS

| | | | |
|---|---|---|---|
| 2,957,833 | 10/1960 | Baum | 260—4 |
| 3,231,635 | 1/1966 | Holden et al. | 260—880 B |
| 3,280,084 | 10/1966 | Zelinski et al. | 260—83.7 |
| 3,281,383 | 10/1966 | Zelinski et al. | 260—880 B |

FOREIGN PATENTS

| | | | |
|---|---|---|---|
| 1,025,295 | 4/1966 | Great Britain | 260—880 B |
| 6404385 | 10/1964 | Netherlands | 260—880 B |
| 6500632 | 7/1965 | Netherlands | 260—876 B |

MURRAY TILLMAN, Primary Examiner

H. ROBERTS, Assistant Examiner

U.S. Cl. X.R.

260—45.95, 836, 876 B, 879, 880 B